United States Patent [19]
Weiss

[11] Patent Number: 6,140,580
[45] Date of Patent: Oct. 31, 2000

[54] RECTANGULAR HOUSING FOR ACCOMMODATING ELECTRIC OR ELECTRONIC COMPONENTS WITH PLATE SEAL

[75] Inventor: Jürgen Weiss, Lübbecke, Germany

[73] Assignee: H.-J. Bernstein GmbH, Hille, Germany

[21] Appl. No.: 09/292,975

[22] Filed: Apr. 16, 1999

[30] Foreign Application Priority Data

Apr. 17, 1998 [DE] Germany .................. 298 06 876 U

[51] Int. Cl.⁷ .................................................. H05K 5/06
[52] U.S. Cl. ......................... 174/52.3; 220/327; 220/378
[58] Field of Search .................. 174/52.3, 17 CT, 174/52.1; 220/327, 378

[56] References Cited

U.S. PATENT DOCUMENTS

| | | | |
|---|---|---|---|
| 3,688,941 | 9/1972 | Bildsten | 220/327 |
| 3,974,933 | 8/1976 | Toth et al. | 220/88 R |

Primary Examiner—Kristine Kincaid
Assistant Examiner—Hung V Ngo
Attorney, Agent, or Firm—Barnes & Thornburg

[57] ABSTRACT

A rectangular housing including a frame, which forms the side walls, a plate fastened on the frame and a door on the frame. On the side facing the plate, the frame includes an undercut groove which is open toward the plate. The groove is bounded by a closing web pointing toward the plate, a center web extending parallel to the plate and a side web extending approximately perpendicularly to the plate. On its side facing the frame, the plate includes a surrounding seal which rests on the front edge of the closing web. The plate is fastened to the frame by several fastening screws.

7 Claims, 2 Drawing Sheets

6,140,580

RECTANGULAR HOUSING FOR ACCOMMODATING ELECTRIC OR ELECTRONIC COMPONENTS WITH PLATE SEAL

BACKGROUND AND SUMMARY OF THE INVENTION

The present invention relates to a rectangular housing for accommodating electric or electronic components, having a frame, which forms the side walls, a plate and a door and more particularly to sealing the plate on the frame.

It is an object of the present invention to provide a housing of the above-mentioned type, in the case of which a simple and perfectly sealed fastening of the plate on the frame can be carried out.

According to the invention, this object is achieved in that, on the side facing the plate, the frame is provided with an undercut groove, which is open toward the outside and is formed by multiple beveling. The groove is bounded by a closing web pointing to the plate, by a center web extending in parallel to the front plate, and by another side web extending approximately perpendicularly with respect to the front plate. On its side facing the frame, the plate is provided with a surrounding seal which rests on the front edge of the closing web, the front plate, as a whole, being fastened against the frame by several fastening screws.

This construction permits the simple fastening of the plate on the housing or on its frame, while simultaneously achieving a perfect seal. In this case, it is possible to fasten the plate from its exterior side as well as from its interior side, without causing a sealing problem.

Thus, for example, according to another idea of the invention, the fastening screws can penetrate the plate and be screwed into nuts which can be displaced within the receiving groove.

In this case, the openings of the plate, through which the screws must be guided, are situated outside the sealed-off area between the plate and the frame, so that a separate sealing-off of the screwing area is not required.

According to another idea of the invention, the fastening screws can be constructed as screw bolts which are fastened on the interior side of the plate facing the housing and each penetrate a first leg of an L-shaped angle bracket. The first leg is supported on the center web and a second leg of the bracket stands directly on the front plate. A nut is screwed onto each screw bolt and is tightened against the first leg of the angle bracket.

Although in this case, the fastening screws are situated within the frame area bound by the surrounding seal of the plate, they do not penetrate the plate itself so that no sealing problems occur. In addition, complicated fastening mechanisms are not required in either case but only simple fastening screws and optional angle brackets.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
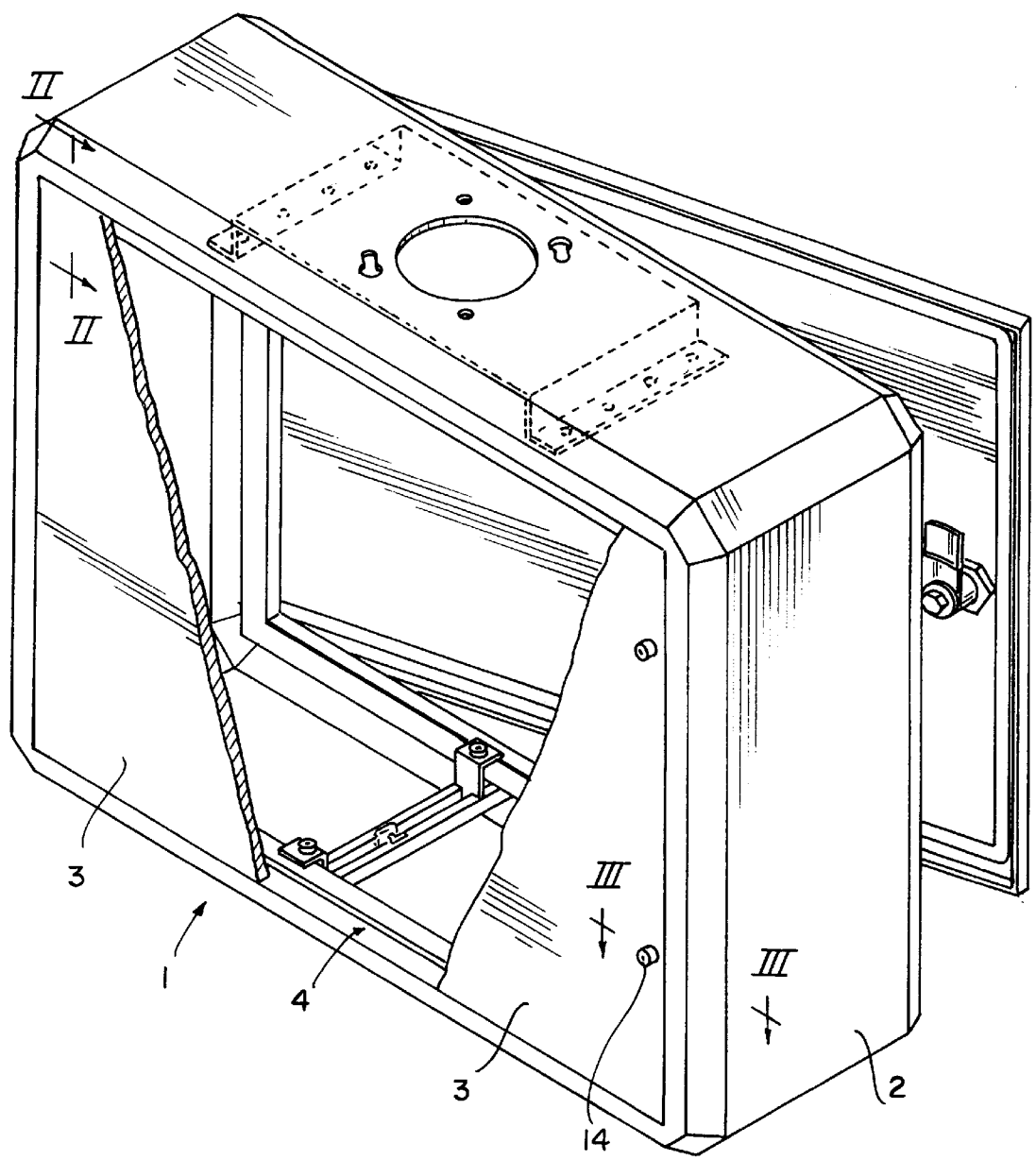
FIG. 1 is a perspective representation of a housing according to the invention with two different possibilities for fastening a plate.

In FIG. 1, reference number 1 indicates an approximately rectangular housing as a whole for accommodating electric or electronic components, which are not shown. This housing 1 has a frame 2, which is preferably made of sheet metal and forms the side walls of the housing 1, a plate 3 which was shown in a partial cut-away in FIG. 1 in order to permit a view into the interior of the housing 1. A door is also shown connected to the frame.

Figure 2:
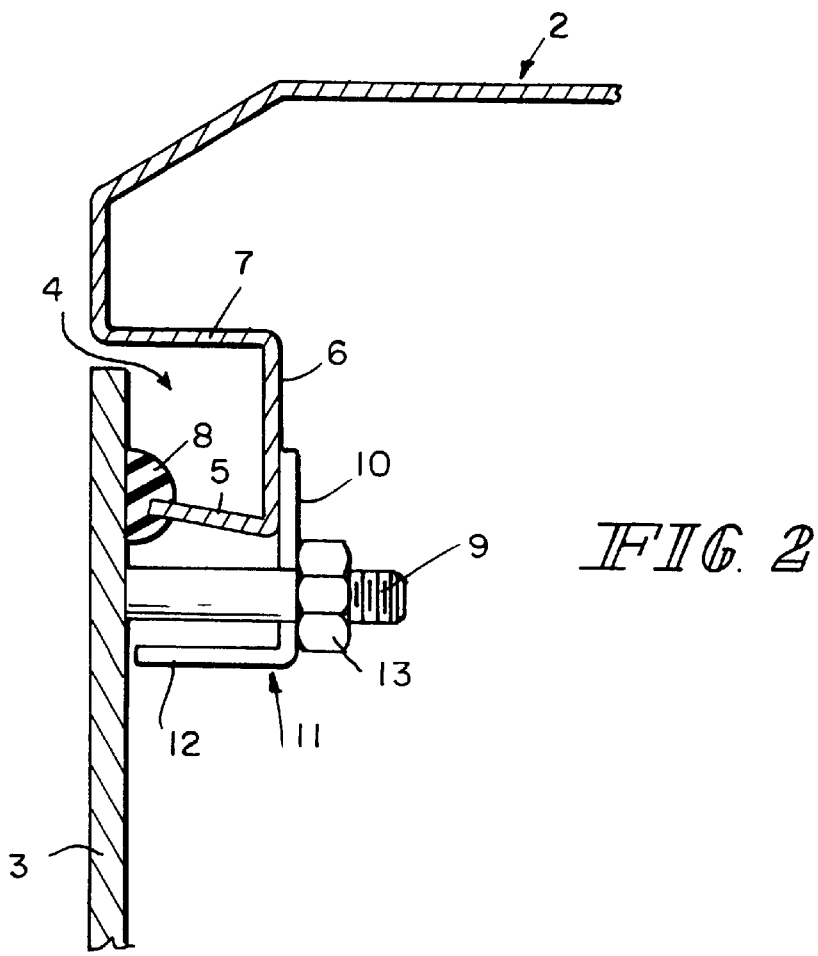
FIG. 2 is a partial sectional view according to Line II—II in FIG. 1.
Figure 3:
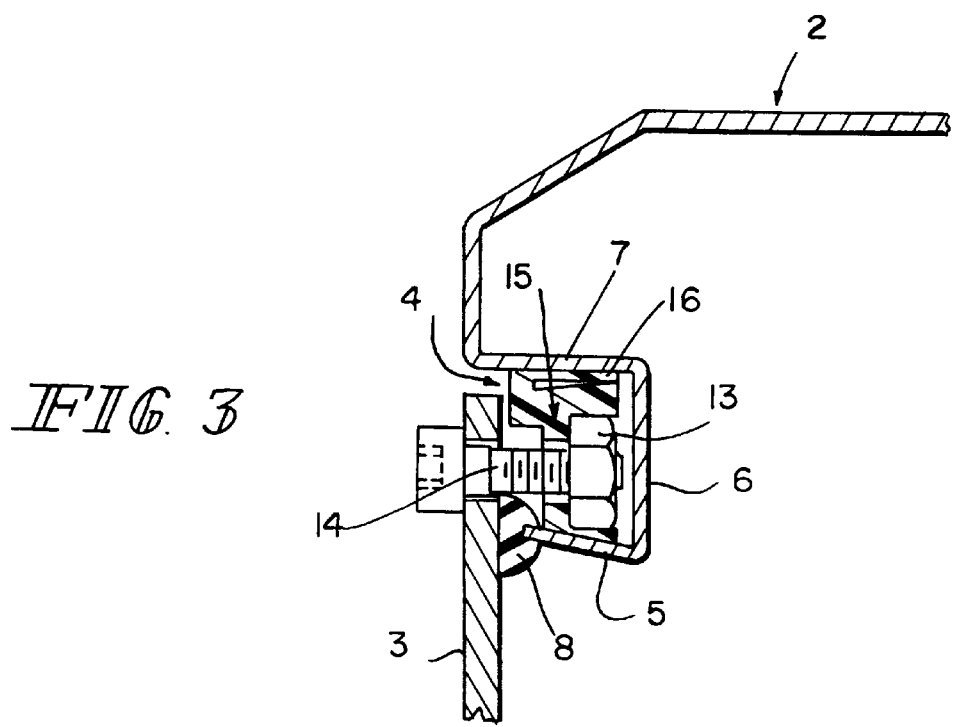
FIG. 3 is a sectional view according to Line III—III in FIG. 1.

On the side facing the plate 3, the frame 2 is provided with an undercut groove 4 which is open toward the outside and is formed by multiple bevelings or folds, which is clearly shown in FIGS. 2 and 3.

This undercut groove 4 is bounded by a closing web 5 pointing to the plate 3, a center web 6 extending in parallel to the plate 3, and a side web 7, which, in turn, extends perpendicularly to the plate 3. The closing web 5 extends in a sloped manner with respect to the plate 3 and, together with the center web 6, encloses an acute angle, so that an undercutting of the groove 4 is obtained.

On its rear wide facing the frame 2, the plate 3 has a surrounding seal 8 which is fixedly connected with the plate 3. This seal 8 can, for example, be glued onto the plate 3.

In the mounted condition of the plate 3, this seal 8 is placed in a sealing manner on the front edge of the closing web 5.

FIGS. 2 and 3 show two different possibilities for fastening the plate 3 with respect to the frame 2.

FIG. 2 illustrates that, on the interior side facing the housing, the plate 3 is equipped with screw bolts 9 which are, for example, welded to the front plate 3. These screw bolts 9 penetrate a leg 10 of an angle bracket 11. The other leg 12 of the angle bracket 11 stands directly on the plate 3. The leg 10 of each angle bracket 11 penetrated by the screw bolts 9 rests on the center web 6. Nuts 13 are screwed onto the screw bolts 9 and are tightened against the leg 10 of the angle bracket 11 resting on the center web 6. As a result, the plate 3 is pulled firmly to the frame 2, the seal 8 being tightened correspondingly firmly against the forward front edge of the closing web 5.

In the embodiment according to FIG. 3, the fastening of the front plate 3 includes fastening screws 14, which penetrate the plate 3 and are screwed into nuts 13 which are slidably arranged inside the groove 4. The nuts 13 are advantageously inserted in a plastic preform 15 which is equipped with a resilient leg 16.

With respect to their cross-section, the plastic preforms are adapted to the shape of the undercut groove 4 and, as the result of the resilient leg 16, are held in a frictionally engaged manner in the groove 4. The nuts 13 are inserted inside the plastic preforms 15 in a manner which is secure with respect to torsion.

As clearly illustrated in FIG. 3, the fastening screws 14 extend outside the sealed area between the plate 3 and the frame 2 so that the openings in the area of the plate 3 do not have to be sealed off separately in order to ensure a tight connection between the front plate 3 and the frame 2 as a whole.

As described above, because of the design of the frame 2, two completely different possibilities exist for fastening and sealing the plate 3. However, both possibilities are easy to implement constructionally and ensure an absolutely tight closure between the plate 3 and the frame 2 in every case.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A rectangular housing for accommodating electric or electronic components comprising:
    a frame which forms the side walls;
    a plate fastened on the frame;
    an undercut groove formed on the side walls of the frame facing the plate and opening toward the plate;
    the groove being bounded by a closing web pointing toward the plate, by a center web extending parallel to the plate, and by a side web extending approximately perpendicular to the plate;
    a surrounding seal on the plate which rests on a front edge of the closing web; and
    fastening screws fastening the plate against the frame.

2. A housing according to claim 1, wherein the fastening screws penetrate the plate and are screwed into displaceable nuts which are slidable inside the groove.

3. A housing according to claim 2, wherein the nuts are secured in plastic preforms and the preforms slide within the groove.

4. A housing according to claim 3, wherein the plastic preforms have a cross-section similar to a cross-section of the groove and have a resilient leg, whereby the preforms frictionally engage the groove.

5. A housing according to claim 1 wherein the closing web extends at an incline with respect to the plate and, together with the center web, forms an acute angle.

6. A housing according to claim 1, wherein the frame is sheet metal.

7. A housing according to claim 1,
    wherein the fastening screws are screw bolts fastened on the interior side of the plate facing the frame;
    including an L-shaped angle bracket, the bolts each penetrates a first leg of the bracket which is supported on the center web, and a second leg of the bracket stands directly on the plate; and
    including a nut screwed onto each screw bolt and tightened against the first leg of the bracket resting on the center web.

* * * * *